United States Patent
Ruan et al.

(10) Patent No.: US 9,600,746 B2
(45) Date of Patent: Mar. 21, 2017

(54) IMAGE PROCESSING APPARATUS AND IMAGE PROCESSING METHOD

(71) Applicant: OMRON Corporation, Kyoto-shi, Kyoto (JP)

(72) Inventors: Xiang Ruan, Shiga (JP); Huchuan Lu, Liaoning-Province (CN); Na Tong, Liaoning-Province (CN)

(73) Assignee: OMRON Corporation, Kyoto (JP)

( * ) Notice: Subject to any disclaimer, the term of this patent is extended or adjusted under 35 U.S.C. 154(b) by 127 days.

(21) Appl. No.: 14/587,802

(22) Filed: Dec. 31, 2014

(65) Prior Publication Data
US 2015/0262039 A1    Sep. 17, 2015

(30) Foreign Application Priority Data

Mar. 13, 2014 (JP) .................. 2014-049586

(51) Int. Cl.
| | |
|---|---|
| *G06K 9/62* | (2006.01) |
| *G06K 9/66* | (2006.01) |
| *G06K 9/32* | (2006.01) |
| *G06K 9/46* | (2006.01) |
| *G06T 7/00* | (2006.01) |

(52) U.S. Cl.
CPC ............ *G06K 9/66* (2013.01); *G06K 9/3233* (2013.01); *G06K 9/4671* (2013.01); *G06K 9/6202* (2013.01); *G06K 9/6256* (2013.01); *G06K 9/6267* (2013.01); *G06T 7/0081* (2013.01); *G06K 2009/6213* (2013.01); *G06T 2207/20081* (2013.01); *G06T 2207/20144* (2013.01); *G06T 2207/20164* (2013.01)

(58) Field of Classification Search
CPC ................... G06K 9/66; G06K 9/6206
USPC ............................................. 382/159
See application file for complete search history.

(56) References Cited

U.S. PATENT DOCUMENTS 7,133,571 B2 *  11/2006  Cheatle ............... G06K 9/38
                                                              382/173
7,400,761 B2 *  7/2008  Ma ...................... G06K 9/3233
                                                              382/162
(Continued)

FOREIGN PATENT DOCUMENTS

| JP | 2001-236508 A | 8/2001 |
|---|---|---|
| JP | 2010-258914 A | 11/2010 |

OTHER PUBLICATIONS

Ken Fukuchi etal.,"Saliency-Based Video Segmentationwith Graph Cuts and Sequentially Updated Priors", 2009 IEEE International Conference on Multimedia and Expo at New York, NY, Jun. 28, 2009-Jul. 3, 2009pp. 638-641.*

(Continued)

*Primary Examiner* — Samir Ahmed
(74) *Attorney, Agent, or Firm* — Osha Liang LLP

(57) ABSTRACT

An image processing apparatus has an image acquisition unit that acquires an image that is to be subjected to processing, a learning sample extraction unit that extracts data of a plurality of learning samples from the image, a classifier learning unit that performs learning of a plurality of classifiers using the plurality of learning samples, a strong classifier generation unit that generates a strong classifier by combining the plurality of learned classifiers, and a saliency map generation unit that generates a saliency map of the image using the strong classifier.

7 Claims, 6 Drawing Sheets

(56) References Cited

U.S. PATENT DOCUMENTS

| | | | |
|---|---|---|---|
| 2006/0093184 A1* | 5/2006 | Fukui | G06K 9/00234 382/103 |
| 2008/0025639 A1* | 1/2008 | Widdowson | G06K 9/3208 382/284 |
| 2008/0304708 A1* | 12/2008 | Le Meur | G06K 9/4623 382/107 |
| 2008/0304740 A1* | 12/2008 | Sun | G06K 9/3233 382/168 |
| 2008/0304742 A1* | 12/2008 | Connell | G06K 9/38 382/170 |
| 2009/0208188 A1* | 8/2009 | Yahata | G11B 27/105 386/248 |
| 2010/0091330 A1* | 4/2010 | Marchesotti | G06K 9/4676 358/1.18 |
| 2010/0226564 A1* | 9/2010 | Marchesotti | G06F 17/30256 382/159 |
| 2011/0229025 A1* | 9/2011 | Zhao | G06K 9/4671 382/165 |
| 2011/0235910 A1* | 9/2011 | Soceanu | G06K 9/00295 382/173 |
| 2012/0093402 A1* | 4/2012 | Staelin | G06K 9/4671 382/165 |

OTHER PUBLICATIONS

Kaiming He, et al.; "Single Image Haze Removal Using Dark Channel Prior"; IEEE Transactions on PAMI; vol. 33; pp. 2341-2353; 2011 (13 pages).

Extended European Search Report issued in EP Application No. 14200539.6, mailed on Jul. 9, 2015 (7 pages).

Q. Zhao, et al.; Learning visual saliency by combining feature maps in a nonlinear manner using AdaBoost'; Journal of Vision, vol. 12, No. 6; Jun. 15, 2012 (15 pages).

Borji A; Boosting bottom-up and top-down visual features for saliency estimation'; Computer Vision and Pattern Recognition (CVPR); 2012 IEEE Conference ON; Jun. 16, 2012 (8 pages).

Yasin Kayak; et al.; "Visual saliency estimation by integrating features using multiple kernel learning"; http://arxiv.org/abs/1307.5693; Jul. 22, 2013 (14 pages).

Paria Mehrani; et al.; "Saliency Segmentation based on Learning and Graph Cut Refinement"; Proceedings of the British Machine Vision Conference 2010; Jan. 1, 2010 (12 pages).

Schapire; et al.; "The Boosting Approach to Machine Learning an Overview"; MSRI Workshop on Nonlinear Estimation and Classification; Dec. 19, 2001 (23 pages).

\* cited by examiner

INPUT IMAGE

SUPER-PIXEL IMAGE

LBP VALUE(X) = 00011111

LBP VALUE(X) = · · ·

⇩ ADD LBP VALUES FOR ALL PIXELS

IMAGE PROCESSING APPARATUS AND IMAGE PROCESSING METHOD

CROSS-REFERENCE TO RELATED APPLICATIONS

This application claims priority to Japanese Patent Application No. 2014-049586, filed on Mar. 13, 2014, which is hereby incorporated by reference herein in its entirety.

BACKGROUND

Field of the Invention

The present invention relates to a technique for automatically detecting a salient region in an image.

Description of the Related Art

Conventionally, in the field of image processing, there are known to be techniques according to which an image region that is predicted to be focused on by a person, or in other words, an image region that is to be given attention (referred to below as a "salient region") is detected in (extracted from) an image. Also, by calculating saliency measures of pixels in the image using such a technique for salient region detection, creation of a saliency map showing the saliency measures of the pixels in the image is also performed.

This salient region detection technique is expected to be applied in a wide range of fields, such as monitoring cameras, robot vision, and machine vision as a fundamental technique for detecting a main object in an image or detecting an abnormality in an image.

Algorithms for salient region detection are broadly divided into model-based methods and learning-based methods. A model-based method is a method of detecting a salient region using a model which is obtained by modelling a model of a person's eye or brain or a hypothesis using a formula. The model-based method is superior in versatility, but no model according to which determination of a person's eye or brain can be perfectly reproduced has yet been constructed, and in order to address various real-world problems, further improvements in accuracy are desired.

On the other hand, a learning-based method is a method of using a large amount of exemplary (sample) data or supervised signals (ground-truth) to learn image features of a salient region (see JP 2001-236508A), and is advantageous in that it does not require a model or a hypothesis and a high-accuracy detector can be constructed more easily. However, in many cases, it is difficult to prepare exemplary data (a learning DB) that encompasses all patterns that are to be detected as salient regions, or the supervised signal (ground-truth) is difficult to define, which are bottlenecks in the practical application of the learning-based method.

As a conventional method in view of the foregoing points, JP 2010-258914A proposes a technique in which a salient region is detected using information between frames that constitute a video, without requiring prior knowledge. However, although the technique disclosed in JP 2010-258914A does not require prior knowledge, it is used only on moving images constituted by multiple frames, and it cannot be applied to evaluating the saliency measure of a still image.

JP 2001-236508A and JP 2010-258914A are examples of background art.

SUMMARY

One or more embodiments of the present invention provides a new learning-based method according to which a salient region can be accurately detected using even one image, without requiring exemplary data for learning.

An image processing apparatus according to one or more embodiments of the present invention includes: an image acquisition unit configured to acquire an image that is to be subjected to processing; a learning sample extraction unit configured to extract data of a plurality of learning samples from the image; a classifier learning unit configured to perform learning of a plurality of classifiers using the plurality of learning samples; a strong classifier generation unit configured to generate a strong classifier by combining the plurality of learned classifiers; and a saliency map generation unit configured to generate a saliency map for the image using the strong classifier.

According to this configuration, since learning is performed using information from the image that is to be subjected to processing itself, exemplary data for learning (prior knowledge) is not required. Also, a strong classifier specific to the image subjected to processing is automatically generated, whereby a final saliency map is obtained, and it is therefore possible to detect a salient region at a higher accuracy than with a conventional technique.

One or more embodiments of the present invention further includes a foreground map generation unit configured to generate a foreground map which segments the image into a foreground region and a background region, wherein the learning sample extraction unit extracts a positive learning sample from the foreground region and extracts a negative learning sample from the background region. For example, according to one or more embodiments of the present invention, the foreground map is a map having values that indicate the foreground-likelihood of each pixel or super-pixel in the image, and the learning sample extraction unit extracts a pixel or a super-pixel having a value indicating foreground-likelihood that is greater than a first threshold value as a positive learning sample, and extracts a pixel or a super-pixel having a value indicating foreground-likelihood that is less than a second threshold value as a negative learning sample.

By first creating such a foreground map and then extracting the positive learning sample and the negative learning sample from the foreground and the background respectively, the validity of the learning sample can be increased, and it is possible to improve the reliability and accuracy of the learning of the classifier.

According to one or more embodiments of the present invention, the foreground map generation unit uses a model-based algorithm to generate a rough saliency map with an accuracy lower than that of the saliency map obtained by the saliency map generation unit, and generates the foreground map based on the rough saliency map.

By using the model-based algorithm, it is possible to generate a saliency map without requiring prior knowledge. Note that the rough saliency map generated by the foreground map generation unit is used for extraction of learning samples, and therefore it may be rough (have a low accuracy).

According to one or more embodiments of the present invention, the foreground map generation unit generates the foreground map by performing segmentation processing on the rough saliency map and compositing the rough saliency map and the segmentation processing result.

Since the rough saliency map shows individual (i.e. local) saliency measures for each pixel or super-pixel, there is a possibility that noise, outliers, and the like will be included therein. By combining the segmentation processing with the rough saliency map and performing categorization into a foreground and a background in units of regions (i.e., on a macro scale), noise and outliers can be reduced, and more valid learning samples can be acquired.

According to one or more embodiments of the present invention, the foreground map generation unit uses a dark-channel index indicating saliency measures that increase as pixels darken, as one index for evaluating the saliency measures of pixels or super-pixels in the rough saliency map. Accordingly, saliency measures can be evaluated with a simple algorithm.

One or more embodiments of the present invention may be an image processing apparatus having at least a portion of the above-described configuration. Also, one or more embodiments of the present invention may be a control method or a saliency map generation method of an image processing apparatus including at least a portion of the above processing, a program for causing a computer to execute the method, or a computer-readable storage medium non-transitorily storing the program. One or more embodiments of the present invention may be configured using any combination of the above-described configurations and processes as long as no technical conflicts occur.

According to one or more embodiments of the present invention, it may be possible to accurately detect a salient region from one image without requiring exemplary data for learning.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. One or more embodiments of the present invention includes a new learning-based salient region detection method. The most significant feature thereof is that salient region detection (synonymous with saliency map generation as well) using one image is possible without requiring exemplary data (prior knowledge). The following framework is used in the present application as the basic idea for realizing this feature.

(1) First, a rough foreground map is calculated using a model-based algorithm.

(2) Positive learning samples and negative learning samples are respectively extracted from a foreground region and a background region in the rough foreground map.

(3) Multiple classifiers are learned using the learning samples defined in step (2).

(4) A strong classifier is constructed by combining the multiple learned classifiers, and a final saliency map is generated using the strong classifier.

According to this algorithm, learning is performed using information of the image itself and classifiers specific to the image are generated, and it is therefore possible to realize a detection accuracy that is higher than that of a conventional technique. Moreover, unlike conventional learning-based algorithms, there is an advantage in that exemplary data (prior knowledge) and supervised signals are not required at all.

Hereinafter, specific embodiments of the present invention will be described in detail with reference to the drawings.

(Configuration)

Figure 1:
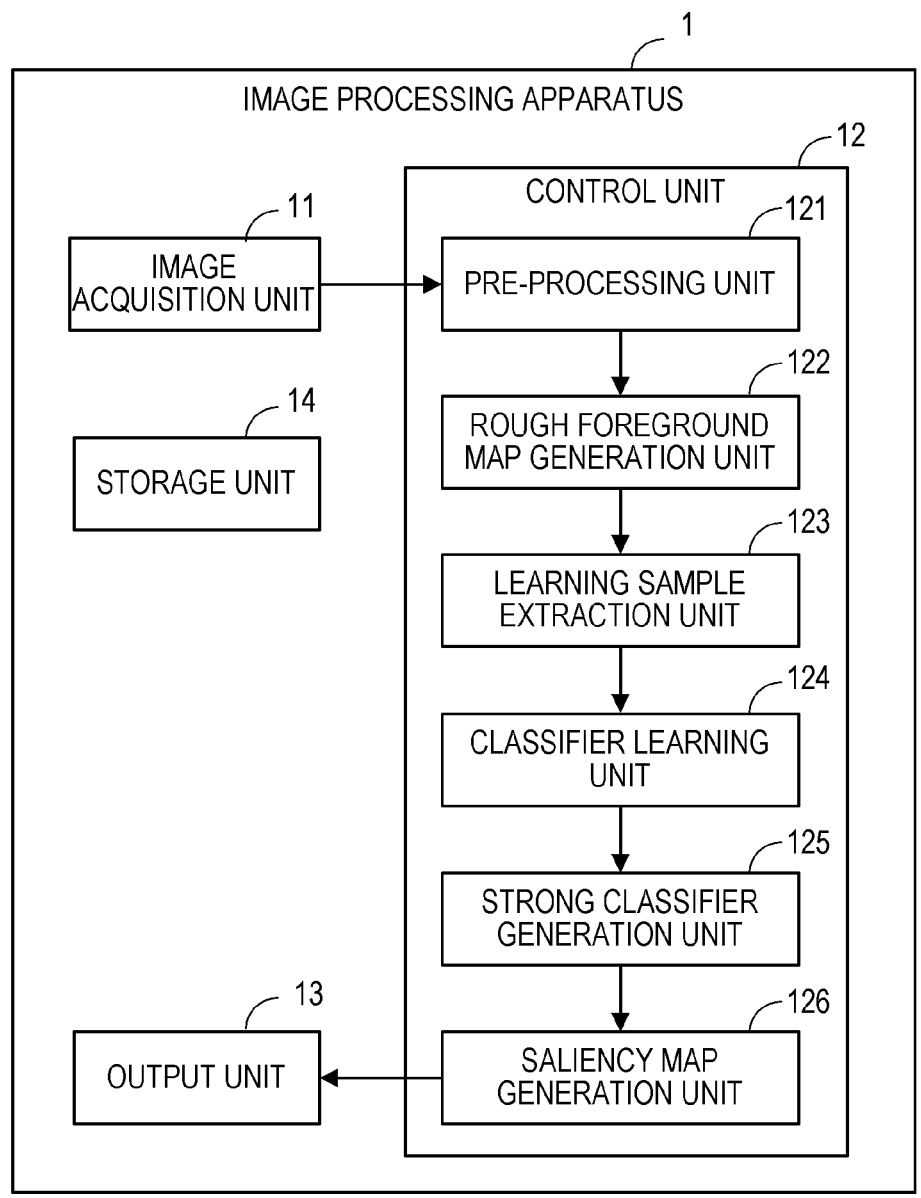
FIG. 1 is an image showing functional blocks of an image processing apparatus according to one or more embodiments of the present invention.

A configuration of an image processing apparatus 1 according to one or more embodiments of the present invention will be described next. FIG. 1 is a functional block diagram showing the configuration of the image processing apparatus 1. The image processing apparatus 1 shown in FIG. 1 acquires an input image and outputs a saliency map showing saliency measures for the pixels of the acquired input image. Note that although a description will be given in which the input image is a still image, it is possible to use a moving image as input and to output saliency maps with respect to the frames of the moving image.

As shown in FIG. 1, the image processing apparatus 1 includes an image acquisition unit 11, a control unit 12, an output unit 13, and a storage unit 14.

From an external device, the image acquisition unit 11 acquires an input image that is to be subjected to processing. For example, in response to a user input operation, the image acquisition unit 11 acquires an input image in real time (in a synchronized manner) or in a non-synchronized manner from an image capturing apparatus such as a digital camera or a digital video camera connected to the image processing apparatus 1.

Note that the method for acquiring the input image is not limited to the above description, and for example, the image acquisition unit 11 may acquire image data stored in the storage unit 14 as the input image, the image acquisition unit 11 may acquire an input image from a peripheral device connected to the image processing apparatus 1, and an input image may be acquired via a wired or wireless communication network.

The control unit 12 performs overall control of various functions of the image processing apparatus 1. The control function of the control unit 12 is realized by a processing device such as a CPU (Central Processing Unit) executing a control program. Alternatively, the control function may be realized by an ASIC (Application Specific Integrated Circuit) or the like. Also, it may be realized using a combination of these units. As part of the control function, the control unit 12 includes a function and a configuration for executing various types of processing on the input image received from the image acquisition unit 11. The function and configuration of the control unit 12 will be described later in detail.

The output unit 13 outputs the result of the control unit 12 processing the input image to the exterior. For example, the output unit 13 may output the above-mentioned processing result to various image applications. The output unit 13 of one or more embodiments of the present invention outputs a saliency map generated by the control unit 12 for the input image acquired by the image acquisition unit 11.

The storage unit 14 stores various types of data and computer programs. The storage unit 14 can be realized by combining storage devices such as a ROM (Read Only Memory), a RAM (Random Access Memory), and a non-volatile memory (e.g., a flash memory), for example.

For example, the storage unit 14 stores a computer program executed by the control unit 12, various types of data processed by the program, and the like.

(Control Unit)

Figure 2:
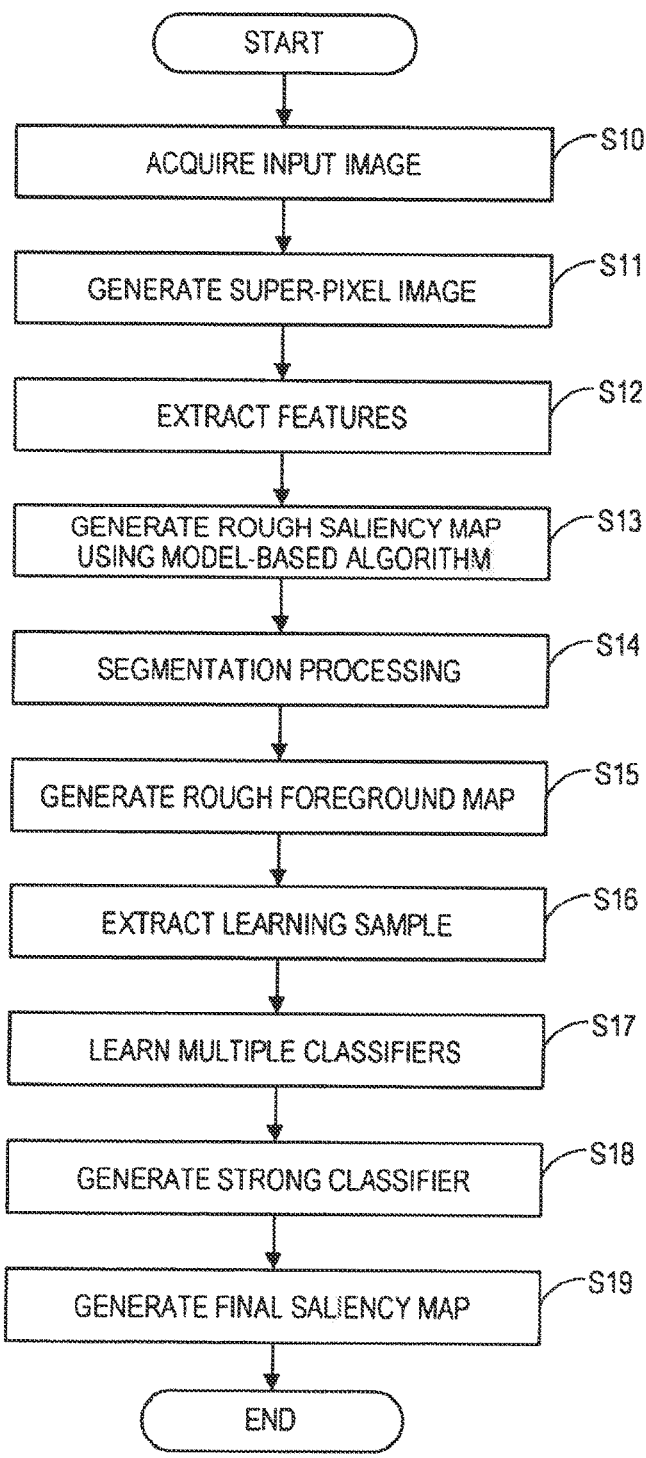
FIG. 2 is a flowchart showing a flow of an image processing method (saliency map generation method) according to one or more embodiments of the present invention.

The units of the control unit 12 will be described next. As shown in FIG. 1, the control unit 12 includes a pre-processing unit 121, a rough foreground map generation unit 122, a learning sample extraction unit 123, a classifier learning unit 124, a strong classifier generation unit 125, and a saliency map generation unit 126. The configuration of the functional units will be described next along with the flowchart in FIG. 2 that shows a flow of the image processing performed by the control unit 12 (saliency map generation processing), and the other drawings.

(Pre-Processing)

First, the control unit 12 acquires the input image received by the image acquisition unit 11 (step S10). The input image is transferred to the pre-processing unit 121. Using the input image acquired from the image acquisition unit 11 as an original image, the pre-processing unit 121 generates, from the original image configured in units of pixels, a super-pixel image (SP image) configured in units of super-pixels (SP: Super Pixel) (step S11). Here, a super-pixel is a small image region composed of multiple neighboring pixels whose values for a parameter such as color or luminance is similar to each other. In other words, it can be said that a super-pixel image is an image divided into multiple connected regions based on features of pixels in an input image. An image configured in units of super-pixels is referred to as a super-pixel image in order to distinguish it from an original image. Multiple generation algorithms are known as generation algorithms for super-pixel images, but in one or more embodiments of the present invention, any algorithm may be used.

By performing image processing using a super-pixel image instead of the original image, the amount of data for processing can be significantly reduced, and therefore it is possible to realize a faster speed of processing and conservation of memory, and noise in the various parameters described above (luminance, color, and the like) can also be suppressed. Note that although a super-pixel image is used in one or more embodiments of the present invention, it is possible to use the original image as-is. In the case of using the original image as-is, the units for the subsequent processing will merely be "pixels" instead of "super-pixels".

Figure 3A:
FIGS. 3A and 3B are diagrams showing examples of an input image and a super-pixel image.
Figure 3B:
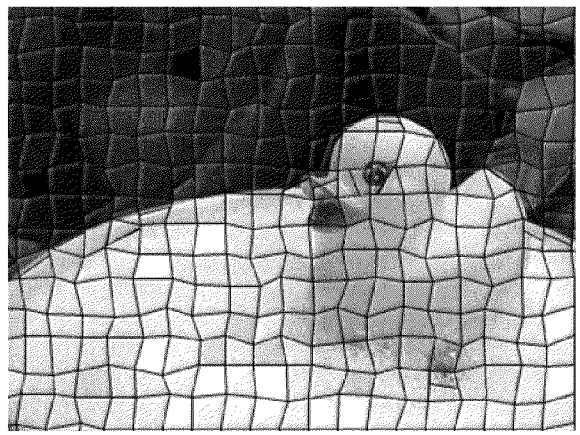

FIGS. 3A and 3B show examples of an input image and a super-pixel image generated by the pre-processing unit 121. With the super-pixel image, a mesh-like pattern is drawn and each divided patch (region) in the mesh is a super-pixel.

(Feature Extraction)

Next, the pre-processing unit 121 performs processing for extracting features of super-pixels on the super-pixel image (step S12). Here, three different types of features are used, namely RGB average values (Ra, Ga, Ba) of a group of pixels constituting a super-pixel, L*a*b* average values (La, Aa, Ba) of the group of pixels constituting the super-pixel, and an LBP (Local Binary Pattern) histogram of the group of pixels constituting the super-pixel. Note that L*a*b* (hereinafter to be referred to as simply "Lab") is a uniform color space defined by the CIE (International Commission on Illumination).

Figure 4:
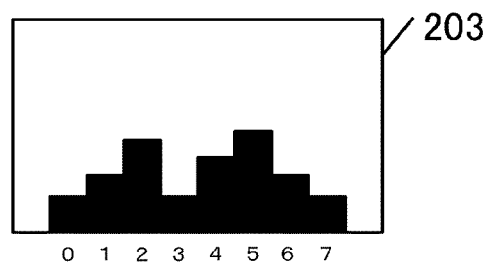
FIG. 4 is a diagram for describing an LBP histogram.

An LBP is obtained by expressing the relationship between a pixel of interest and pixels near the pixel of interest with a binary pattern. FIG. 4 is a diagram for describing a method for calculating features using an LBP. Reference numeral 201 is a region that is a cut-out portion of an input image. The region 201 has a size of 3 pixels×3 pixels, and the pixel represented by the black color in the center is a pixel that is to be subjected to processing (a pixel of interest).

Here, a pattern is generated which indicates whether the luminance values of eight pixels near the pixel of interest are bright or dark with respect to the pixel of interest. Specifically, if the luminance value is less than 5, a 0 is provided, and if it is greater than or equal to 5, a 1 is provided. As a result, a pattern such as that indicated by reference numeral 202 is generated. Binary values generated in this way are aligned in order from the upper left, and an 8-bit value (LBP value) is generated.

Then, the LBP values calculated for all pixels constituting the super-pixels are added up for each bit, and a histogram is generated. As a result, it is possible to obtain a histogram such as that indicated by reference numeral 203. The LBP histogram 203 (i.e., an 8-dimensional vector) is the feature corresponding to the super-pixel.

(Rough Foreground Map Generation)

Next, the rough foreground map generation unit 122 generates a rough foreground map with respect to the super-pixel image (steps S13 to S15). Specifically, the processing is performed in the following order: model-based saliency map generation processing (step S13), segmentation processing (step S14), rough foreground map generation processing (step S15). Hereinafter, each process will be described in detail.

(1) Model-Based Saliency Map Generation Processing (Step S13)

The rough foreground map generation unit 122 generates a rough saliency map by applying simple salient region detection processing to the super-pixel image and calculating the saliency measures of the super-pixels. Here, "rough" means that a high accuracy is not required. In other words, since the rough saliency map generated here aims to extract a learning sample, the accuracy thereof may be lower than that of the saliency map that will ultimately be obtained. In one or more embodiments of the present invention, a simple model based on the following three hypotheses are used to obtain a saliency measure according to equation (1) below.

Contrast: A portion with high contrast has a high saliency measure.

Center Prior: The more toward the center of the image the super-pixel is located, the higher the saliency measure thereof is.

Dark-channel: A dark portion has a high saliency measure.

Equation 1

$$f_0(c_i) = \underbrace{\sum_{k \in 3spaces} \left( \frac{1}{N_B} \sum_{j=1}^{N_B} d_k(c_i, n_j) \right)}_{Contrast} \times \underbrace{g(x, y)}_{Center\ Prior} \times \underbrace{da(c_i)}_{Dark\text{-}channel} \quad (1)$$

Here, $c_i$ is the i-th super-pixel (super-pixel of interest), and $f_0(c_i)$ is the saliency measure of the super-pixel of interest.

Contrast is an index that uses the sum of the feature differences between a super-pixel of interest and super-pixels in the vicinity thereof as the saliency measure. k is a type of feature, and in one or more embodiments the present invention, three different types are used, namely RGB average values, Lab average values, and LBP histogram. $n_j$ is the j-th vicinity super-pixel, and $N_B$ is the number of vicinity super-pixels. $d_k$ is the distance between the super-pixel of interest $c_i$ and the vicinity super-pixel $n_j$ in the feature space for the feature k.

Center Prior is an index that uses the closeness to the image center of the super-pixel of interest as the saliency measure. A specific calculation method thereof is shown in equation (2).

Equation 2

$$g(x,y) = \exp(-(x-x_c)^2/(2\sigma_x^2) - (y-y_c)^2/(2\sigma_y^2)) \quad (2)$$

Here, (x, y) are the position coordinates of the super-pixel of interest in the image, and $(x_c, y_c)$ are the central coordinates of the image. Also, $\sigma_x$ and $\sigma_y$ are parameters (constants) for controlling the spread of the Gaussian distribution.

Dark-channel is an index that uses the darkness of the super-pixel of interest $c_i$ as the saliency measure. A specific calculation method thereof is shown in equation (3).

Equation 3

$$da(p) = 1 - \min_{q \in patch(p)} \left( \min_{c \in r,g,b} (I^c(q)) \right) \quad (3)$$

Here, p is the super-pixel of interest (same as $c_i$ in equation (1)), and q is a pixel constituting the super-pixel of interest p. c represents a channel (R, G, B) of the pixels, and $I^c(q)$ is the value of channel c of pixel q. According to equation (3), the minimum value of all of the channels of all of the pixels constituting the super-pixel p, and a value obtained by subtracting the minimum value from 1 is obtained as the dark-channel value.

According to equation (1), a rough saliency map $f_0$ for the image is obtained by calculating the saliency measures of all super-pixels included in the image.

(2) Segmentation Processing (Step S14)

Next, the rough foreground map generation unit 122 performs segmentation processing on the rough saliency map $f_0$ obtained in step S13 so as to generate a region-divided map $f_1$. Segmentation processing is region dividing processing in which an image is divided into a foreground region and a background region, and here, the optimal contour (border between the foreground and background) of the foreground region is searched for so that as many of the super-pixels with high saliency measures in the saliency map $f_0$ as possible are categorized in the foreground. Various algorithms for segmentation, such as graph cuts, level sets, and snakes have conventionally been proposed, and any algorithm may be used as the algorithm for segmentation. Graph cuts are used in one or more embodiments of the present invention. The region-divided map $f_1$ indicates whether each super-pixel is in the foreground (1) or background (0). Note that rather than the foreground-likelihood of the super-pixels being indicated by two values, namely foreground (1) and background (0), it may be a map indicated by probabilities (real-number values from 0 to 1).

(3) Rough Foreground Map Generation Processing (Step S15)

Next, the rough foreground map generation unit 122 generates a rough foreground map by compositing the saliency map $f_0$ obtained in step S13 and the region-divided map $f_1$ obtained in step S14. In one or more embodiments of the present invention, the average value of the values for the saliency map $f_0$ and the region-divided map $f_1$ for each super-pixel are used as the rough foreground map $f_2$ (=$(f_0 + f_1)/2$).

(Learning Sample Extraction)

Next, based on the rough foreground map $f_2$, the learning sample extraction unit 123 extracts a positive learning sample and a negative learning sample from the super-pixel image (step S16). A positive learning sample is data that is to be used as a sample of the foreground (salient region) in later classifier learning. A group of super-pixels in which the value of the rough foreground map $f_2$ (foreground-likelihood) is larger than a predetermined threshold value Tp is extracted as a positive learning sample. On the other hand, a negative learning sample is data that is to be used as a sample of the background (not the salient region) in later classifier learning. A group of super-pixels in which the value of the rough foreground map $f_2$ (foreground-likelihood) is smaller than a predetermined threshold value Tn is extracted as a negative learning sample. Note that, according to one or more embodiments of the present invention, the threshold values Tp and Tn are set such that Tn<Tp and to exclude super-pixels in which the values of the rough foreground map $f_2$ range between Tn to Tp (i.e., super-pixels whose status of being in the foreground or background is unclear) from the learning samples.

Classifier Learning

Next, based on the learning samples obtained in step S16, the classifier learning unit 124 performs learning of multiple classifiers (step S17). Classifiers for performing classification of both positive and negative classes are used as the classifiers. Many classifier learning algorithms have conventionally been proposed, and any algorithm can be used as well. In one or more embodiments of the present invention, a support vector machine (SVM) is used.

The SVM has a feature of being able to configure different classifiers by changing a kernel function. In one or more embodiments of the present invention, four types of kernel functions, namely a linear function, a polynomial function, RBF (Radial Basis Function), and a sigmoid function are used. Also, three types of features, namely RGB average values, Lab average values, and an LBP histogram are obtained based on the super-pixels, and therefore 4 types of kernel functions×3 types of features=12 types of classifiers are learned. Note that the numbers and types of Kernel functions and features are an example, and other numbers and types may be used.

(Strong Classifier Generation)

Next, by combining the 12 classifiers learned in step S17, the strong classifier generation unit 125 constructs a strong classifier (step S18). Boosting is an operation of generating a strong classifier by combining multiple weak classifiers. For example, many algorithms such as AdaBoost have conventionally been proposed for boosting, and any of them may be used. Note that a strong classifier is a classifier with a classification capability higher than that of a weak classifier. Note that in one or more embodiments of the present invention, boosting is used to combine the classifiers so as to generate a strong classifier, but another method, such as bagging, random forest, or the like may be used.

Figure 5:
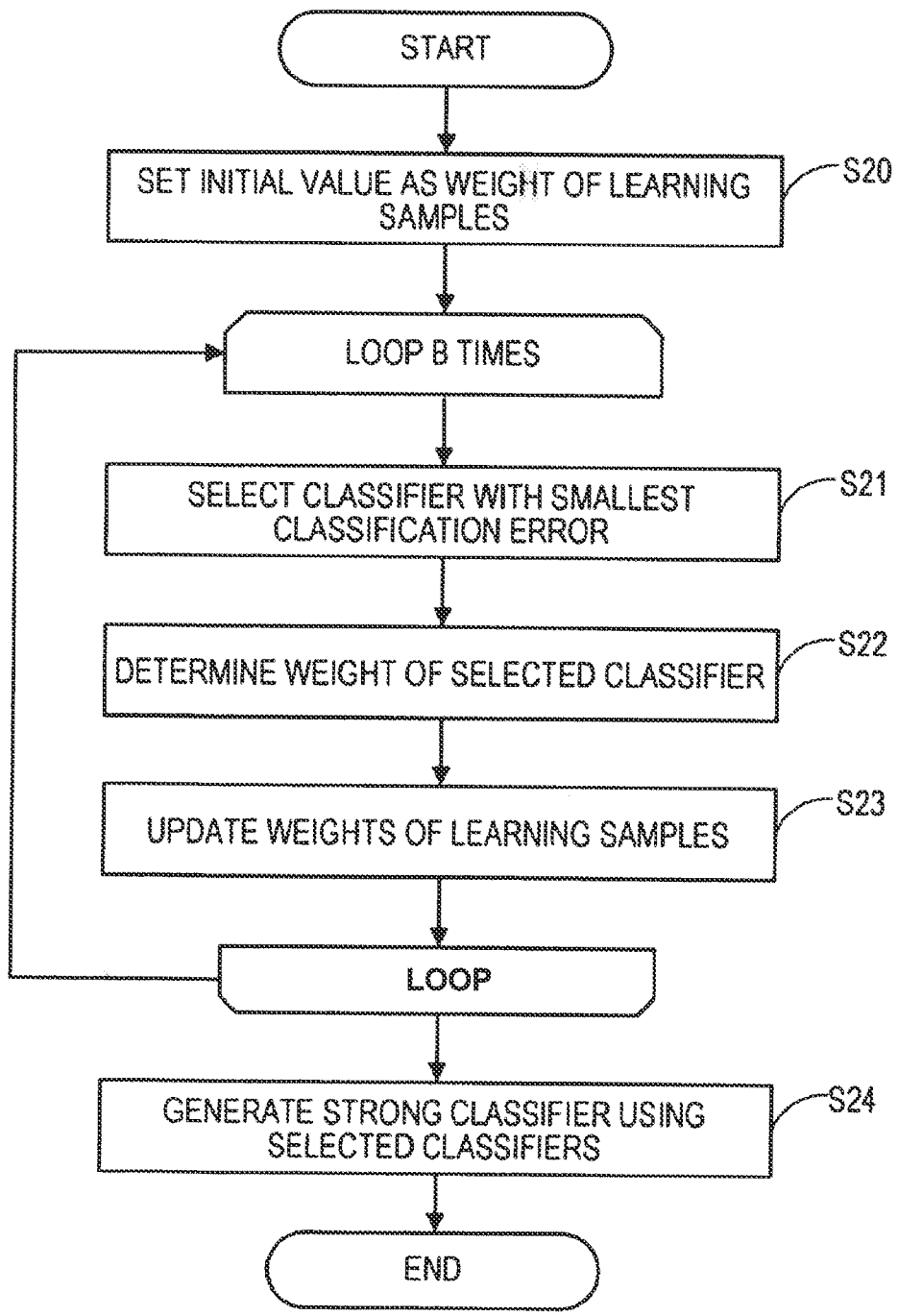
FIG. 5 is a flowchart showing a flow of boosting processing.

FIG. 5 shows a flow of processing for boosting according to one or more embodiments of the present invention. In boosting, the positive and negative learning samples obtained in step S16 are used.

First, the strong classifier generation unit 125 sets an initial value 1/D as the weight w of each learning sample (step S20). D is the number of learning samples. Then, classification of the D weighted learning samples is performed using each of the 12 respective classifiers, and a classifier S with the smallest classification error is selected (step S21). Next, weight β of the selected classifier S is determined based on the classification error (step S22). Thereafter, based on the classifier S, the weight β, and the classification error, the weight w of each of the learning samples is updated (step S23). At this time, the weights w are adjusted so that learning sample classification is more difficult.

By repeating the processing of steps S21 to S23 a predetermined number of times (B times), B sets are obtained which are each composed of a classifier S and a weight β. By linearly combining the B classifiers S as shown in the following equation, the strong classifier generation unit 125 generates a final strong classifier Y (step S24).

Equation 4

$$Y(r) = \sum_{b=1}^{B} \beta_b S_b(r)$$

Here, r is a pixel or a super-pixel that is to be classified.

(Saliency Map Generation)

When the strong classifier Y is obtained according to the above processing, the saliency map generation unit 126 inputs the pixels of the original image (the image received in step S10) in the strong classifier Y and calculates the saliency measures of the pixels, thereby generating the final saliency map (step S19).

According to the above-described method, it is possible to perform learning of a classifier using information of an input image itself and to generate a saliency map for the input image using the classifier, without requiring prior knowledge at all.

(Experiment Results)

Figure 6:
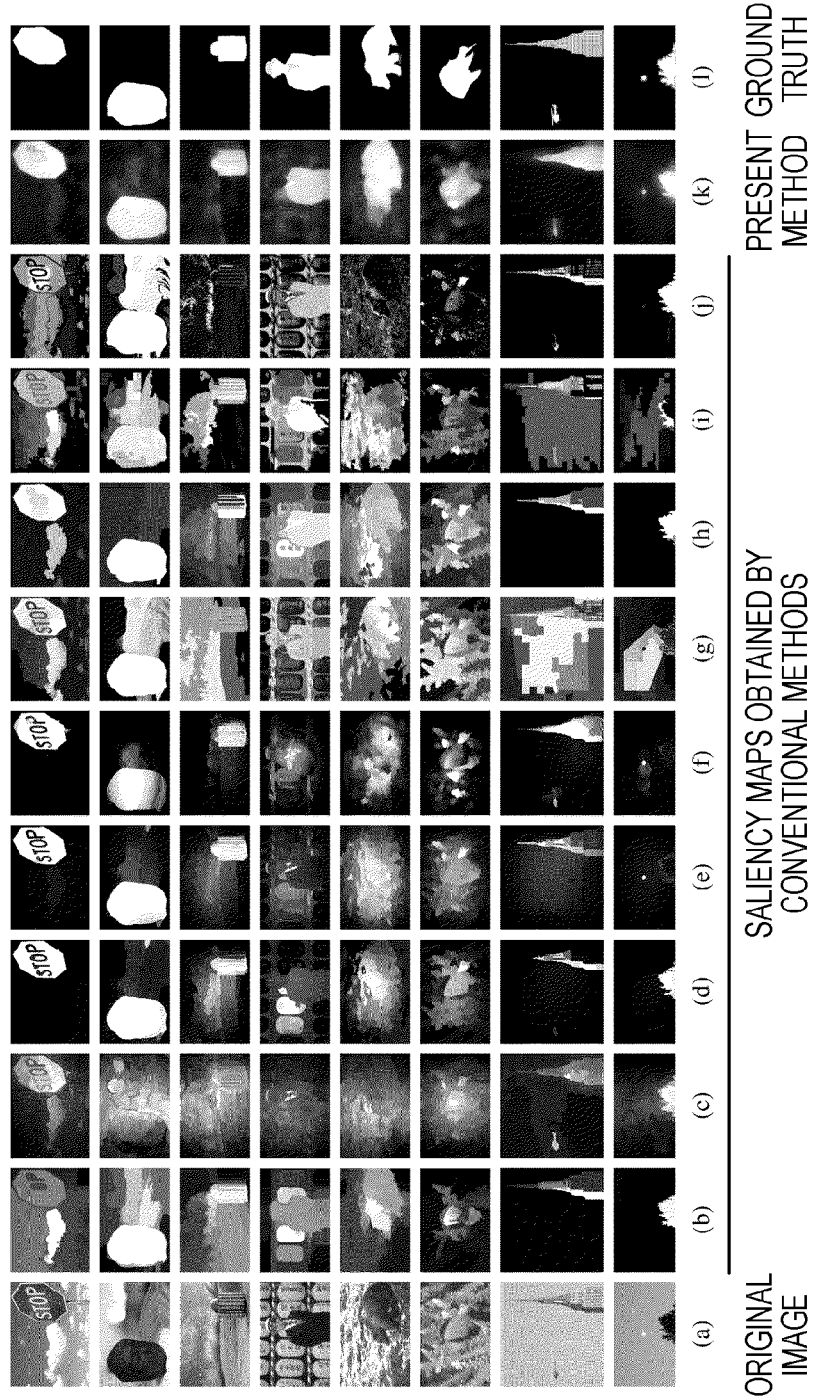
FIG. 6 is a diagram showing a comparison of a saliency map generated using the present method and saliency maps generated using conventional techniques.

Saliency maps obtained using the present method and conventional techniques will be described next. FIG. 6 shows (a) the original image, (b) to (j) saliency maps obtained using conventional methods, (k) a saliency map obtained using the present method, and (l) a correct map (ground-truth). It is evident that according to the present method, a salient region can be detected with greater accuracy compared to conventional techniques.

Modified Example

The above-described embodiments show specific examples of the invention and are not intended to limit the scope of the invention to that specific example.

For example, in one or more of the above-described embodiments, a super-pixel image is used, but similar processing may be performed on the input base image as it is. In such a case, the processing unit is not a super-pixel, but merely a pixel. Also, in one or more of the above-described embodiments, a rough foreground map $f_2$ is generated from a saliency map $f_0$ obtained by model-based salient region detection and a region-divided map $f_1$ obtained by segmen-tation. However, the saliency map $f_0$ may be used as-is as the rough foreground map $f_2$. Also, in one or more of the above-described embodiments, when the saliency map $f_0$ is generated, the saliency measures are evaluated based on the contrast, dark-channel, and center prior of the pixels, but other models and hypotheses may be used. Also, in one or more of the above-described embodiments, three types of features, namely RGB average values, Lab average values, and an LBP histogram are used, but another type of feature may be used, and any number of features may be used. Also, the type of classifier, the learning algorithm, and the boosting method are not limited to those described in the embodiments above.

Example of Implementation

As for a specific implementation of the above-described image processing apparatus, implementation using software (a program) and implementation using hardware are possible. For example, the processes may be realized by storing a computer program in the memory of a computer (a microcomputer, CPU, MPU, FPGA, etc.) built into an image processing apparatus and causing the computer to execute the computer program. Also, according to one or more embodiments of the present invention, a dedicated processor such as an ASIC or the like are employed for performing all or a portion of the processing of one or more embodiments of the present invention using a logic circuit. Also, one or more embodiments of the present invention may be applied to a server in a cloud environment as well.

Also, for example, one or more embodiments of the present invention can be implemented using a method composed of steps executed by a computer of a system or an apparatus that realizes the functions of one or more of the above-described embodiments by loading and executing a program recorded in a storage device. For this purpose, the above-described program is provided to the above-described computer via a network, or from various types of recording mediums (i.e., computer-readable recording mediums non-transitorily storing data) capable of being the above-described storage device, for example. Accordingly, the computer (includes devices such as a CPU or an MPU), the method, the program (includes a program code or a program product), and the computer-readable recording medium non-transitorily storing the program are included in the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

LIST OF REFERENCE NUMERALS

1 Image processing apparatus
11 Image acquisition unit
12 Control unit
13 Output unit
14 Storage unit
121 Pre-processing unit
122 Rough foreground map generation unit
123 Learning sample extraction unit
124 Classifier learning unit
125 Strong classifier generation unit
126 Saliency map generation unit

What is claimed is:

1. An image processing apparatus comprising:
an image acquisition unit that acquires an input image that is to be subjected to processing;
a foreground map generation unit that generates a foreground map, which indicates a foreground region and a background region in the input image, based on the input image;
a learning sample extraction unit that extracts data of a positive learning sample from the foreground region in the input image and extracts data of a negative learning sample from the background region in the input image, based on the foreground map;
a classifier learning unit that performs learning of a plurality of classifiers using the positive and negative learning samples extracted from the input image;
a strong classifier generation unit that generates a strong classifier by combining the plurality of learned classifiers; and
a saliency map generation unit that generates a final saliency map of the input image using the strong classifier.

2. The image processing apparatus according to claim 1,
wherein the foreground map is a map having values indicating foreground-likelihood for each pixel or each super-pixel of the image, and
wherein the learning sample extraction unit extracts a pixel or a super-pixel having a value indicating foreground-likelihood that is greater than a first threshold value as a positive learning sample, and extracts a pixel or a super-pixel having a value indicating foreground-likelihood that is less than a second threshold value as a negative learning sample.

3. The image processing apparatus according to claim 1,
wherein the foreground map generation unit uses a model-based algorithm to generate a rough saliency map with an accuracy lower than that of the final saliency map obtained by the saliency map generation unit, and generates the foreground map based on the rough saliency map.

4. The image processing apparatus according to claim 3,
wherein the foreground map generation unit generates the foreground map by performing segmentation processing on the rough saliency map and compositing the rough saliency map and a result of the segmentation processing.

5. The image processing apparatus according to claim 3,
wherein the foreground map generation unit uses a dark-channel index indicating saliency measures that increase as pixels darken, as one index for evaluating the saliency measure of a pixel or a super-pixel in the rough saliency map.

6. An image processing method, comprising:
an image acquisition step of acquiring an input image that is to be subjected to processing;
a foreground map generation step of generating a foreground map, which indicates a foreground region and a background region in the input image, based on the input image;
a learning sample extraction step of extracting data of a positive learning sample from the foreground region in the input image and of extracting data of a negative learning sample from the background region in the input image, based on the foreground map;
a classifier learning step of performing learning of a plurality of classifiers using the positive and negative learning samples extracted from the input image;
a strong classifier generation step of generating a strong classifier by combining the plurality of learned classifiers; and
a saliency map generation step of generating a final saliency map of the input image using the strong classifier.

7. A non-transitory computer-readable storage medium storing a program that causes a computer to perform:
an image acquisition step of acquiring an input image that is to be subjected to processing;
a foreground map generation step of generating a foreground map, which indicates a foreground region and a background region in the input image, based on the input image;
a learning sample extraction step of extracting data of a positive learning sample from the foreground region in the input image and of extracting data of a negative learning sample from the background region in the input image, based on the foreground map;
a classifier learning step of performing learning of a plurality of classifiers using the positive and negative learning samples extracted from the input image;
a strong classifier generation step of generating a strong classifier by combining the plurality of learned classifiers; and
a saliency map generation step of generating a final saliency map of the input image using the strong classifier.

* * * * *